United States Patent
Hogan, Jr.

(10) Patent No.: US 8,827,706 B2
(45) Date of Patent: Sep. 9, 2014

(54) DEVICES, SYSTEMS AND METHODS FOR FIREARMS TRAINING, SIMULATION AND OPERATIONS

(75) Inventor: Richard Russell Hogan, Jr., Pacific, MO (US)

(73) Assignee: Practical Air Rifle Training Systems, LLC, Pacific, MO (US)

( * ) Notice: Subject to any disclaimer, the term of this patent is extended or adjusted under 35 U.S.C. 154(b) by 476 days.

(21) Appl. No.: 12/383,860

(22) Filed: Mar. 25, 2009

(65) Prior Publication Data

US 2009/0253103 A1 Oct. 8, 2009

Related U.S. Application Data

(60) Provisional application No. 61/039,346, filed on Mar. 25, 2008.

(51) Int. Cl.
*G09B 19/00* (2006.01)
*F41A 33/06* (2006.01)

(52) U.S. Cl.
CPC ............... *F41A 33/06* (2013.01); *G09B 19/00* (2013.01)
USPC .................. 434/18; 434/11; 434/12; 434/16; 434/19; 434/22; 434/24

(58) Field of Classification Search
USPC ................ 434/24, 11, 12, 18, 19, 16, 74, 22; 463/36, 49; 446/473; 42/84, 51; 361/232; 89/7; 345/633; 124/73, 74; 244/63; 181/120
See application file for complete search history.

(56) References Cited

U.S. PATENT DOCUMENTS

| | | | |
|---|---|---|---|
| 1,743,576 A | 1/1930 | Smith | |
| 4,073,280 A | 2/1978 | Koehn et al. | |
| 4,083,349 A | 4/1978 | Clifford | |
| 4,108,272 A * | 8/1978 | Paitson et al. | 181/120 |
| 4,137,893 A | 2/1979 | Beauchamp | |
| 4,332,098 A * | 6/1982 | Estenevy | 42/84 |
| 4,380,437 A | 4/1983 | Yarborough, Jr. | |
| 4,488,370 A | 12/1984 | Lemelson | |
| 4,725,235 A * | 2/1988 | Schroeder et al. | 434/18 |
| 4,804,325 A * | 2/1989 | Willits et al. | 434/22 |
| 4,923,402 A | 5/1990 | Marshall et al. | |
| 5,062,232 A | 11/1991 | Eppler | |
| 5,168,114 A | 12/1992 | Enget | |
| 5,303,495 A * | 4/1994 | Harthcock | 42/84 |
| 5,316,479 A | 5/1994 | Wong et al. | |
| 5,461,812 A | 10/1995 | Bennett | |
| 5,564,211 A | 10/1996 | Mossberg et al. | |

(Continued)

FOREIGN PATENT DOCUMENTS

| | | |
|---|---|---|
| DE | 3510169 | 9/1986 |
| EP | 0285586 | 10/1988 |
| WO | WO 91/12480 | 8/1991 |

*Primary Examiner* — Nikolai A Gishnock
*Assistant Examiner* — Randall N Crenwelge
(74) *Attorney, Agent, or Firm* — Jones IP Group

(57) ABSTRACT

Methods and apparatus for providing firearms training without using traditional firearms. Replicas of firearms have control systems in communication with magazines inserted into the replicas to control the number of rounds that can be fired for each magazine. The control systems can also monitor, record and communicate data relating to all use of the replica to centralized control units. Additionally, the control systems can include location sensors to monitor the location of the replicas and only authorize firing of the replicas in approved locations.

12 Claims, 4 Drawing Sheets

(56) References Cited

U.S. PATENT DOCUMENTS

| | | | |
|---|---|---|---|
| 5,591,032 A | 1/1997 | Powell et al. | |
| 5,651,206 A | 7/1997 | Matarazzo | |
| 5,675,925 A | 10/1997 | Wurger | |
| 5,842,300 A * | 12/1998 | Cheshelski et al. | 42/116 |
| 5,913,303 A | 6/1999 | Kotsiopoulos | |
| 5,915,936 A | 6/1999 | Brentzel | |
| 5,954,507 A * | 9/1999 | Rod et al. | 434/19 |
| 6,146,141 A * | 11/2000 | Schumann | 434/11 |
| 6,223,461 B1 | 5/2001 | Mardirossian | |
| 6,257,893 B1 | 7/2001 | Trabut | |
| 6,301,815 B1 | 10/2001 | Sliwa | |
| 6,314,671 B1 | 11/2001 | Gering | |
| 6,322,365 B1 | 11/2001 | Shechter et al. | |
| 6,412,207 B1 | 7/2002 | Crye et al. | |
| 6,415,542 B1 | 7/2002 | Bates et al. | |
| 6,481,140 B1 | 11/2002 | Marshall | |
| 6,545,661 B1 | 4/2003 | Goschy et al. | |
| 6,563,940 B2 | 5/2003 | Recce | |
| 6,572,375 B2 * | 6/2003 | Shechter et al. | 434/19 |
| 6,575,753 B2 | 6/2003 | Rosa et al. | |
| 6,678,984 B1 | 1/2004 | Rapp et al. | |
| 6,709,272 B2 | 3/2004 | Siddle | |
| 6,711,843 B2 | 3/2004 | Klebes | |
| 6,752,137 B2 | 6/2004 | Brunette et al. | |
| 6,817,130 B2 | 11/2004 | Ivanov | |
| 6,823,621 B2 | 11/2004 | Gotfried | |
| 6,856,238 B2 | 2/2005 | Wootton et al. | |
| 6,869,285 B1 * | 3/2005 | Jones, II | 434/16 |
| 6,966,775 B1 | 11/2005 | Kendir et al. | |
| 7,051,900 B2 | 5/2006 | Reeves | |
| 7,143,644 B2 | 12/2006 | Johnson et al. | |
| 7,188,444 B2 | 3/2007 | Danner et al. | |
| 7,287,527 B1 | 10/2007 | Piper | |
| 7,291,014 B2 | 11/2007 | Chung et al. | |
| 7,306,462 B2 | 12/2007 | Metcalfe et al. | |
| 7,329,127 B2 | 2/2008 | Kendir et al. | |
| 7,337,774 B2 | 3/2008 | Webb | |
| 7,345,265 B2 | 3/2008 | Page | |
| 7,356,959 B2 | 4/2008 | Schmitter et al. | |
| 7,389,604 B2 | 6/2008 | Newkirk et al. | |
| 2002/0012898 A1 | 1/2002 | Shechter et al. | |
| 2003/0195046 A1 * | 10/2003 | Bartsch | 463/49 |
| 2003/0228557 A1 | 12/2003 | Abe | |
| 2004/0014010 A1 | 1/2004 | Swensen et al. | |
| 2004/0244253 A1 | 12/2004 | Glock | |
| 2005/0074726 A1 * | 4/2005 | Metcalfe et al. | 434/18 |
| 2006/0027225 A1 | 2/2006 | Homsky | |
| 2006/0180134 A1 * | 8/2006 | Illuzzi | 124/74 |
| 2007/0015116 A1 | 1/2007 | Coleman | |
| 2007/0132785 A1 * | 6/2007 | Ebersole et al. | 345/633 |
| 2007/0186761 A1 * | 8/2007 | Perry | 89/7 |
| 2007/0190495 A1 | 8/2007 | Kendir et al. | |
| 2007/0238073 A1 | 10/2007 | Portoghese et al. | |
| 2007/0275354 A1 * | 11/2007 | Beckmann | 434/12 |
| 2007/0287132 A1 * | 12/2007 | LaMons et al. | 434/11 |
| 2008/0039962 A1 | 2/2008 | McRae | |
| 2008/0108021 A1 | 5/2008 | Slayton et al. | |
| 2008/0127538 A1 | 6/2008 | Barrett et al. | |
| 2008/0131848 A1 | 6/2008 | Wilson et al. | |
| 2009/0120420 A1 * | 5/2009 | Tippmann et al. | 124/73 |
| 2009/0253103 A1 * | 10/2009 | Hogan, Jr. | 434/24 |
| 2009/0323248 A1 * | 12/2009 | Brundula et al. | 361/232 |
| 2010/0123041 A1 * | 5/2010 | Nair et al. | 244/63 |
| 2010/0154270 A1 * | 6/2010 | Laney et al. | 42/51 |

\* cited by examiner

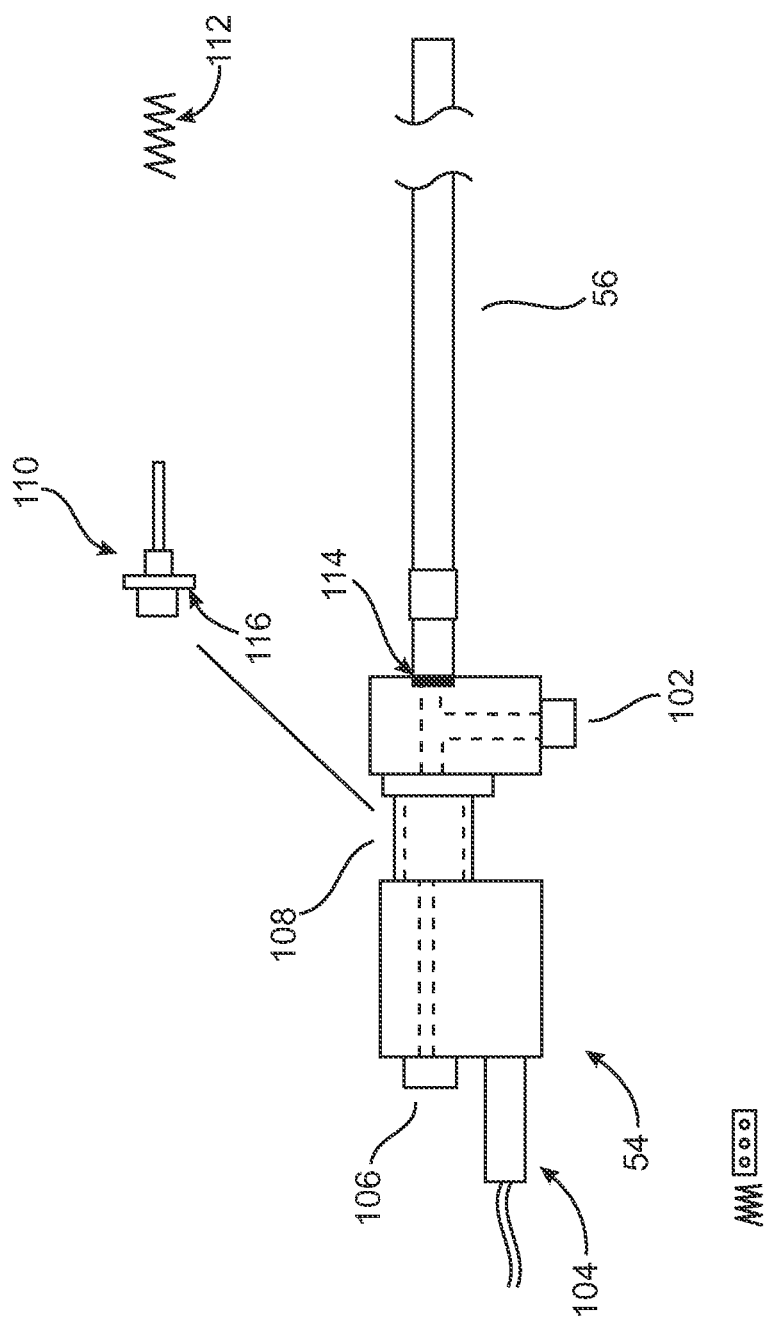

DEVICES, SYSTEMS AND METHODS FOR FIREARMS TRAINING, SIMULATION AND OPERATIONS

This application claims benefit of U.S. Provisional Patent Application Ser. No. 61/039,346, filed on Mar. 25, 2008, which is expressly incorporated by reference in its entirety into this application

FIELD OF THE INVENTION

Embodiments of the present invention relate to devices, systems and methods for firearms training, simulation and operations. Embodiments may comprise firearms simulators or replicas that emit laser or other light energy or that utilize compressed air or gas for firing projectiles.

SUMMARY OF THE INVENTION

Certain embodiments of the present invention relate to devices, systems and methods for firearms training, simulation and operations. Embodiments may comprise firearms simulators or replicas that emit laser or other light energy or that utilize compressed air or gas for firing projectiles. Embodiments may also comprise sensor and processor systems in one or more firearm simulators that monitor and/or control the operation or performance of the firearm simulator or replica. Embodiments may also comprise control and safety systems associated with one or more simulators or replicas. Embodiments may also comprise centralized control and monitoring systems that communicate with and monitor and/or control one or more simulators or replicas.

BRIEF DESCRIPTION OF THE DRAWINGS

Aspects of the inventions herein are described in greater detail by reference to the attached figures. It is to be understood that the particular need of the figures does not supersede the generality of the descriptions herein of the inventions described and claimed herein.

FIG. 4 shows an exemplary embodiment of the feed fire device 54 of an exemplary replica.

DETAILED DESCRIPTION OF THE INVENTION

Figure 1:
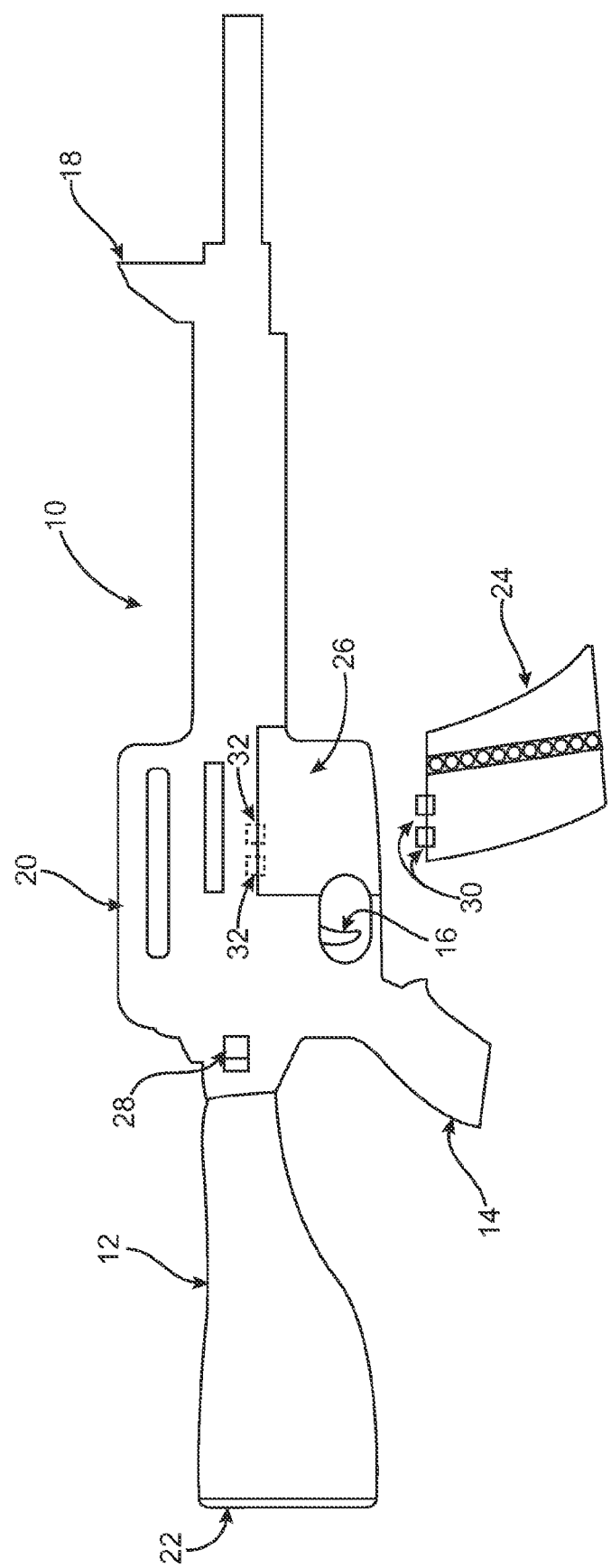
FIG. 1 illustrates an exemplary replica according to an embodiment of the present invention.

In some embodiments of the present invention a non-gunpowder replica of a gunpowder firearm may be configured to fire a laser or other light energy beam. In some embodiments a replica of a gunpowder firearm may be configured to utilize compressed gas or air to fire a projectile. In some embodiments a replica of a gunpowder firearm may be configured to interchangeably fire a laser or other light energy beam or to utilize compressed gas or air to fire a projectile. The replicas may closely resemble the look, feel, weight and balance of an actual firearm. In some embodiments the replicas may have designs not simulating actual firearms. The replicas may resemble shoulder fired firearms or handguns or other devices.

In some embodiments, the replicas and related systems are particularly useful in avoiding the expense, risk, danger, lead dispersion problem, noise and other potentially negative aspects of using gunpowder rounds in training exercises. Further, it has been found that in many training exercises, acceptable training can be accomplished with the replicas only firing relatively small caliber projectiles, such as BB's (0.177 inch ball bearings) at relatively low velocities, or higher velocities as well. In some embodiments the replicas are configured to provide virtually identical look, feel, recoil and action as the gunpowder firearm they simulate, but without many of the disadvantages of gunpowder firearms.

In some embodiments, systems are provided in which each replica in a training environment is configured with programmable processing components in the replica which can be in communication with one or more central control programmable systems. The programmable processors in the replica can be configured to control or define limits in the operation of each replica. Further, the central control system can monitor and control the use of each replica in a training exercise via communication systems with and in conjunction with the programmable systems in each replica.

In some embodiments the replicas may be configured or switchable to fire single shots, bursts of shots or automatic (or continuous) bursts of shots.

In some embodiments the replicas may comprise replicas of actual firearms to which have been added components selected from compressed gas or air firing mechanisms, laser or light energy emitting and focusing systems, recoil simulators, firearm action simulators, and firing or action sound simulators. The replicas may also comprise replaceable magazines, electrical power sources, electrical batteries, and/or compressed gas or air reservoirs. Further, the replicas may include programmable systems for operating and controlling the firing and other operations of the replica. In this application in certain instances the term replica may mean a replica of an existing firearm or of a non-existing firearm or, in some instances, a device not having the appearance of a firearm but which can operate in the fashion or fashions described herein.

In some embodiments the replicas may comprise digital processors and memory units that can be programmed and operated as described in this application.

In some embodiments the replicas may comprise transmitting and receiving systems capable of transmitting data, commands, signals and/or instructions from one or more replicas to one or more other replicas or to one or more central control units.

In some embodiments the replicas may include multiple signal processors to facilitate operation of software and programs associated with separate components of the replicas. In some embodiments the replicas may include detachable magazines that may or may not hold projectiles to be fired and which magazines may or may not comprise computing systems, signal processors and/or memory systems. The replicas may include systems that sense the presence of a magazine in the replica. The systems may also facilitate communications between processors in the magazine and in the replica main body. In some embodiments, the magazine may be programmed to "hold" a predetermined number of projectiles or figurative rounds. In the operation of the replica by a user, when a shot or simulated shot is made using the replica the processors and/or memory units in the main body and the magazine may cooperate, or function individually, to "count" the shots fired and simultaneously track the number of remaining projectiles or simulated shots still "unfired" in the magazine. In this fashion a user of the replica is presented with a real life simulation of use of a magazine having only a predetermined number of rounds available in the magazine. When the predetermined number of rounds has been fired and the magazine capacity thereby depleted the processors in the replica can function to disable further firing of the replica until the "spent" magazine is removed from the replica and a different magazine, containing "unfired" rounds (be it either projectiles or simulated shots—such as laser shots) is properly and functionally inserted into the appropriate receiver in the replica. When the "new" magazine is inserted into the replica, the processors, memory units and signaling systems can cooperatively function to allow the replica to "fire" again—up to the number of "rounds" in the new magazine.

The control systems in the replica (including the various processors, memory systems, signaling systems and transmitting/receiving systems in the replica) capable of being programmed to require the user of the replica to accomplish whatever action may required or desired for simulation or training in order to use the replica. For example, in some instances the user may need to cycle the action of the replica, clear a "jamb" in the action or bolt or take some other action in simulation or training. The control systems of the replica monitor the user actions in this regard and either enable or disable firing of the replica based on the proper or improper actions of the user. In some embodiments, the replica control systems have the capability of being programmed to monitor all systems and operations of the replica and also to enable or disable various components or actions of the replica.

In some embodiments, the control systems in the replicas may also include electronic or digital compasses or directional finders, GPS location sensing systems, single axial accelerometers, multiple axial, including triaxial, accelerometers, gyroscopes, magnetometers, orientation sensors, and angular rate sensors.

FIG. 1 illustrates an exemplary replica according to an embodiment of the present invention. Shown in FIG. 1 is a replica 10, having a stock portion 12, a handgrip portion 14, a trigger assembly 16, a front sighting portion 18 a rear sighting portion 28, butt plate 22, magazine 24, magazine receiving portion 26, bolt return device 28, magazine electrical contacts 30, and magazine receiving portion of electrical contacts 32.

Figure 2:
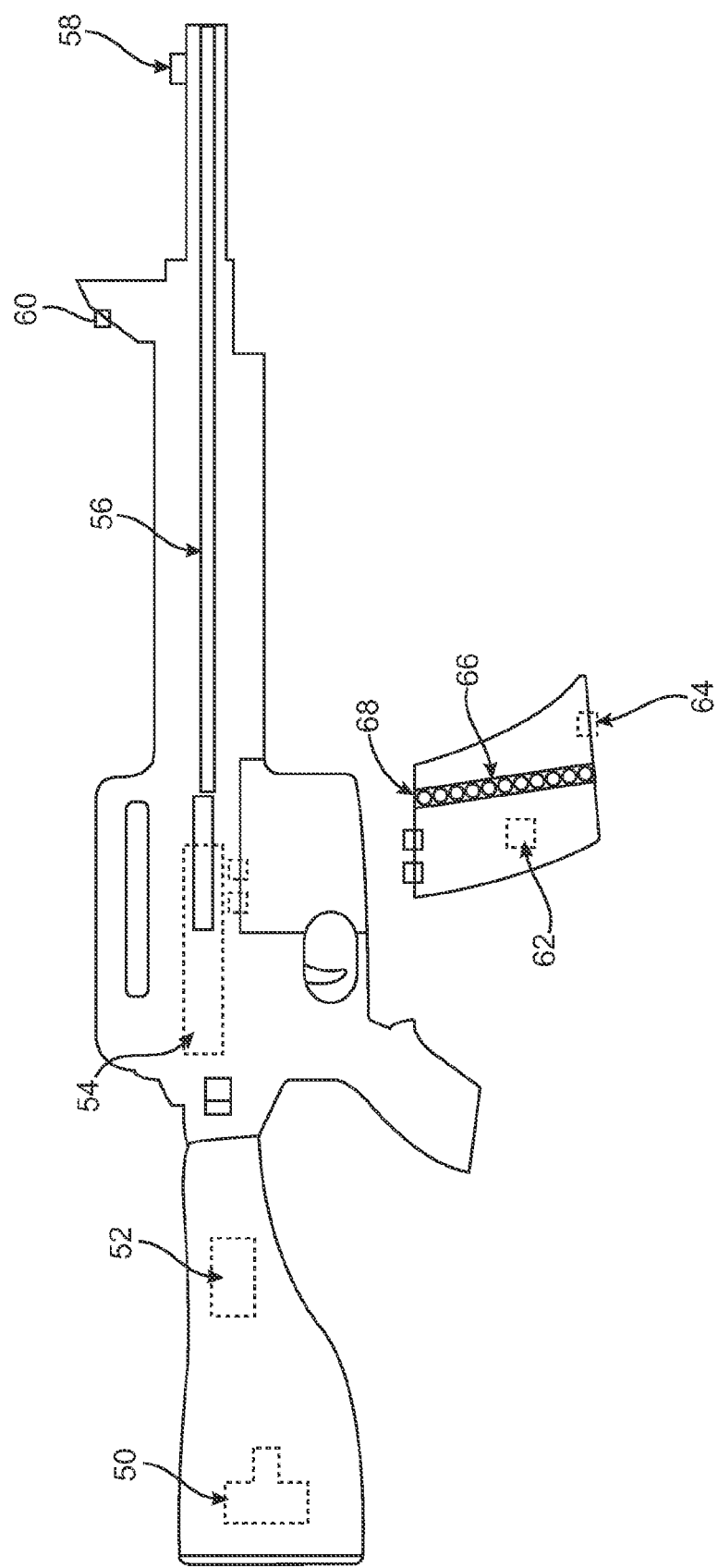
FIG. 2 illustrates a further aspect of the replica of FIG. 2.

FIG. 2 further illustrates the replica of FIG. 1 also shows certain internal components in the replica. Internal components shown include recoil device 50, control system 52, feed fire device 54, barrel assembly 56, accelerometer system 58 and operator shake optical feed back system 60. Further shown are processing unit 62 and communications link 64. Further shown is projectile feed tube 66, and projectiles 68.

Figure 3:
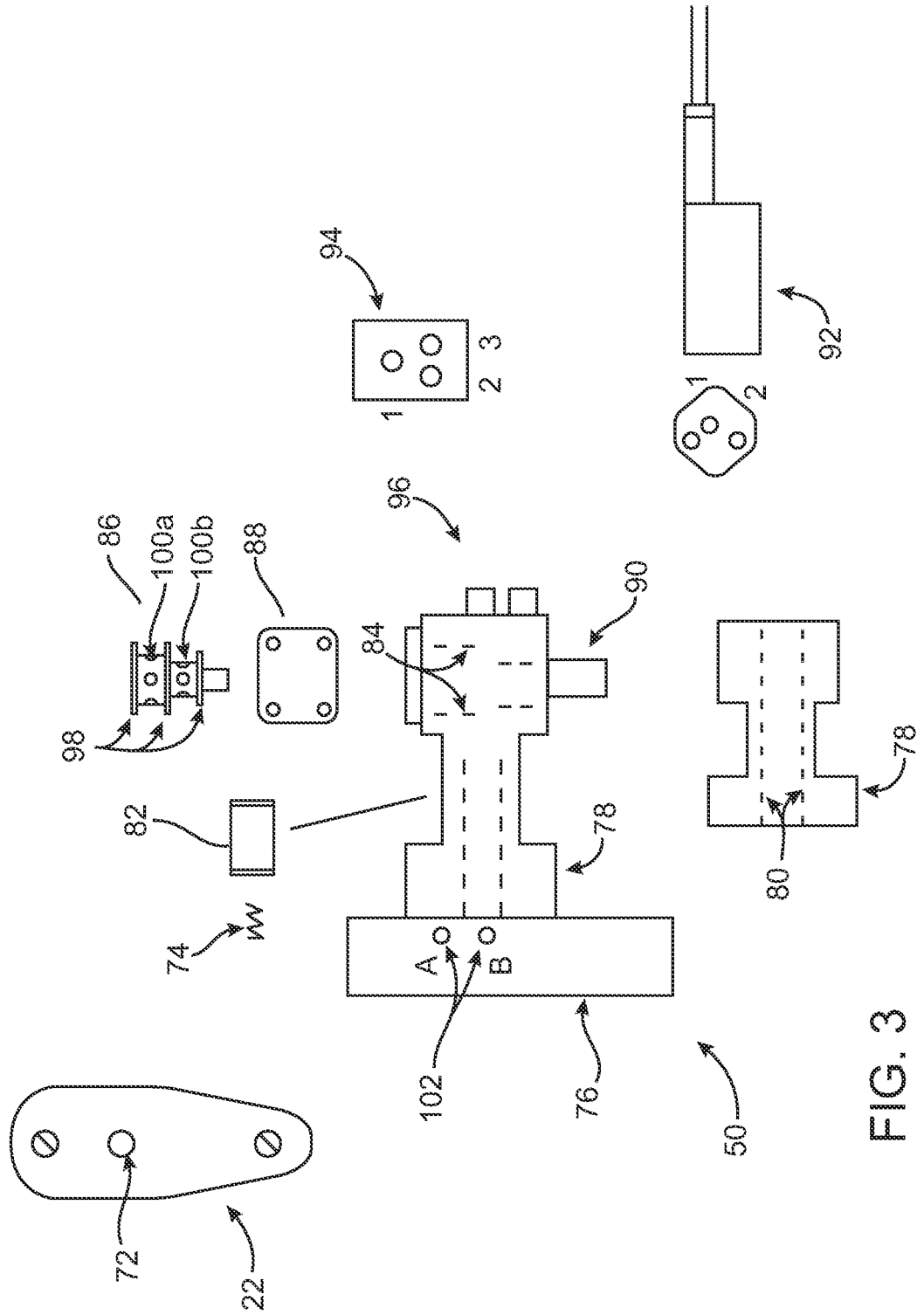
FIG. 3 shows an exploded view of components of a recoil device.

FIG. 3 shows an exploded view of components of the recoil device 50. Shown are butt plate 22, with recoil piston return spring receiver 72, recoil piston return spring 74, recoil anvil 76, recoil cylinder body 78 showing piston path 80, recoil piston 82, air valve shuttle 86, air valve shuttle cylinder 84, air valve access cover 88, gas input 90, solenoid 92, exemplary gas port plate 94, gas ports 96, O-rings 98 on the air valve shuttle, gas ports 100 on the air valve shuttle, and gas ports 102 on the recoil anvil.

In the embodiment shown in FIGS. 1 and 2 the magazine includes processing unit 62 which can be programmed to indicate a certain number of rounds that can be actually or conceptually contained in the magazine. When the magazine is inserted into the magazine receiver, he optical connections are established through contacts 30 and 32 to the control system 52. The control system 52 is programmed to recognize the insertion of a magazine having "unfired rounds" and to check other operating parameters. Upon determining that all required parameters are met pursuant to control system programming, the control system 52 can authorize the replica to fire the number of projectiles or rounds indicated by processing unit 62. The control system 52 then operates in response to operator controls, such as the firing of the trigger 16 to control the functioning of the feed fire device 54 in the recoil device 50. When the trigger is pulled, feed fire device will fire a projectile and at an appropriately timed sequence trigger the action of the recoil device 50. The control system counts the number of projectiles fired while the particular magazine is in the magazine receiver. Unless the control system disables firing for some other reason, the replica will continue to be enabled to fire projectiles for so long as the predetermined number of projectiles for the magazine has not been exceeded. When the full number of the projectiles in the magazine have been fired, the control system determines that the full contents of the magazine have been expended in disables operation of the replica until a new magazine is inserted into the magazine receiver. At that point the control system will communicate with the processing unit in the magazine and determine the appropriate number of projectiles or rounds that can be "fired" in conjunction with the newly inserted magazine and enable firing of the replica until the predetermined number of rounds of the newly inserted magazine is expended in this fashion, the user of the replica is trained in firing the replica with only a limited number of rounds in each magazine before magazine replacement is necessary—just as in the use of an actual gunpowder fire.

In some embodiments, the capability of the control system of the replica to determine the predetermined number of rounds authorized for firing with a newly inserted magazine combined with the ability to count the number of rounds fired and then disable firing of the replica until a new magazine is inserted provides the replica with a unique training capability.

In some alternate embodiments, the replica can function without indication from the processing unit 62 to the control system 52 to communicate a fixed number of rounds for each newly inserted magazine. In some such embodiments, the replica can simply cease to fire when all projectiles in the magazine are expended.

In some embodiments, the actual projectiles are not fired, but light, such as laser light, is fired from the replica. In certain such embodiments, the control system of the replica indicates with the processing unit of the magazine in similar fashion as described above to determine the appropriate number of rounds authorized for the newly inserted magazine, to count the laser rounds fired, and disable further firing of the replica once the predetermined number of rounds has been expended.

In some embodiments, the control system of the replica can disable firing of the replica even though "unfired rounds" are still actually or figuratively (in the case of laser type firing) in the magazine in the replica. Such disabling can be caused to occur if the control system senses violation of any of the other parameters that it is programmed to monitor. Such parameters can include an unauthorized geographical location of the replica, an unauthorized direction of fire attempted with the replica, the occurrence of unauthorized actions with the replica, the attempted use of the replica by an unauthorized user or without the presence of an authorized user of the replica or other parameters.

The operation of the recoil device 50 will now be described. In general, the recoil device 50 employees a recoil anvil 76, a recoil cylinder body 78 and a recoil piston 82. When the recoil device is actuated, gas pressure accelerates and propels the recoil piston along the piston path 80 until it strikes the recoil anvil 76 creating a recoil event with the replica. A feature of an embodiment of the present invention is that the recoil cylinder body, recoil anvil and recoil piston assemblies can be connected to the actuator solenoid 92 by flexible tubing so as to reduce damage to the solenoid by shock and vibration caused by the action of the recoil device 50. The separation of the solenoid from the actual cylinder body is facilitated via the additional feature of the air valve shuttle 86. The air valve shuttle 86 is positioned in the air valve shuttle cylinder 84. In operation the air valve shuttle can travel from a first position to a second position within the air valve shuttle cylinder. In operation the air valve shuttle transmits gas from the gas input 92 to the piston path 80 forcing the recoil piston 82 along the piston path 80 toward the anvil 72. In the first position of the air valve shuttle the gas ports 100 are not in communicative position with the piston path 80. When the air valve shuttle is in the second position, the gas ports 100 are in communicative positions. In the second position of the air valve shuttle gas ports 100a are in communicative position with the piston path 80, and gas ports 100b are in communicative position with conduits not shown which communicate gas through the recoil cylinder body to the inside surface of air valve access cover 88. Air valve shuttle 88 has an internal gas passageway along its axis to communicate gas from the bottom of air valve shuttle 86 to the gas ports 100. In operation, when the recoil simulator is activated, the solenoid 92 is actuated by the replica control system and opens a valve on a gas feed to allow gas pressure to enter gas inlet 90. When gas enters inlet 90 the pressure of the gas forces the air valve shuttle from its first position to its second position. At the second position gas pressure and gas in substance is passed from gas inlet 90 through the internal gas passageway to gas ports 100a and into the piston path 80 forcing the recoil piston 82 along the path of the piston path 80 to strike the recoil anvil 76. When the recoil piston 82 is at a position of impact or near impact against the recoil anvil 76, recoil piston 82 passes by gas ports in the piston path 80 not shown which communicate gas pressure from the piston path 82 gas ports 102. Gas ports 102 are designed to provide an audio simulation of the firing of a weapon is providing audio simulation of the firing of the replica. Additionally when the recoil gas is passing out gas ports 102, the gas pressure within the piston path is reduced in relative amount to the pressure residual at that time issuing from ports 102b to the inner surface of air valve access cover 88. At that point in time, the higher pressure on the inner surface of air about access cover 88 forces the air valve shuttle 86 from the second position back to the first position. With reduced gas pressure in piston path 80, the recoil piston return spring 74 operates to return the recoil piston to its first position awaiting another actuation of the recoil device 50. By providing only flexible as compared to fixed contact between the solenoid 92 and the recoil cylinder body 78, the solenoid 92 is insulated from shock and damaging effects of the operation of the recoil device 50.

FIG. 4 shows an exemplary embodiment of the feed fire device 54. Shown is barrel assembly 56, magazine interface loading port 102, solenoid 104 which is operably coupled with control system 52 to be actuated by the control system, gas line input 106, piston housing feed assembly 108, feed plunger 110, piston return spring 112, O-ring projectile retainer 114 which also serves as a piston gas seal and O-ring 116.

In operation, projectiles from the magazine are presented at the magazine interface loading port and the feed plunger travels to push the presented projectile against the O-ring 116. The projectile is now in a ready to fire state. When the trigger is pulled, the control system actuates the solenoid 104 to allow gas to travel from the gas line input to the piston housing assembly. The received gas pressure presses against the feed plunger which in turn travels and pushes the projectile through the O-ring 116. At approximately the same time the gas travels through a port axially positioned in the plunger to provide gas pressure behind the projectile forcing it to travel down the barrel assembly. The control system can be adjusted to provide different durations of gas to the assembly. In some embodiments the duration of the gas provision is set to an extended time to approximate the amount of time needed for the projectile to travel down the barrel assembly. By this system it is possible to provide a highly consistent velocity to sequential projectiles fired by the replica. The consistency in velocity is a result of application of a consistent application of a predetermined gas pressure to the back of the projectile for the duration of its travel down the barrel assembly. When the projectile has left the barrel the control system causes the solenoid to return to its closed position stopping the flow of gas into the barrel. With the lack of gas pressure behind the plunger, the piston return spring pushes the plunger back to a first position allowing a next projectile to be presented against the O-ring and ready to be fired.

In some embodiments it is recommended to use nitrogen as a feed gas for operation of the replica. The thermodynamic properties of nitrogen gas are such as to significantly reduce the cooling of the replica systems upon expansion of the nitrogen gas from its pressurized reservoir, thus virtually eliminating ice formation and freeze up that can occur with the use of other gasses.

The control system can be instructed to change the rate of fire as desired. Due to the simple elements of construction of these embodiments, the replica can produce a widely ranging rate of fire by simply altering the timing of the actuation of the solenoid 104 and the solenoid 92. In some embodiments the control system operates to fire the solenoid 104 a short time before actuating solenoid 92, thus providing a realistic user experience in which the recoil does not occur until after the projectile is fired. The extended duration of gas pressure behind the projectile provides more consistent velocity than is found with a short shot of pressurized gas.

Another advantage of providing a consistent gas pressure matching the approximate travel time of the projectile down the barrel is that higher projectile velocities and more consistent projectile velocities can be achieved using a lower choked gas pressure at the firing gas actuator solenoid 104 that would be possible using a shorter duration burst type shot of gas to the back of the projectile. This facilitates use of less bulky and less expensive solenoids and less wear and damage to the solenoids than would be encountered if higher pressure shorter burst gas releases were implemented.

In some embodiments a central gas reservoir is utilized for both the firing and the recoil systems. The gas pressure reaching each of those systems can be choked down to the same or different pressures for each of the firing and recoil systems. In some embodiments it is possible to use a diverter, solenoid, or other device to implement an alternate choke device in the replica to supply a higher pressure gas supply to the firing systems. Thus upon receipt of appropriate instructions to use a higher firing system gas pressure the control system of the replica can switch the gas supply to the firing systems from a first choked supply to a second higher pressure choked supply, thus providing a higher velocity to projectiles fired by the replica in the second instance. Alternatively, an adjustable choke can be utilized and varied by instructions from the control system of the replica to supply higher or lower gas pressures to the firing system.

In some embodiments the overall system can include a central control system that mates with and communicates with the magazines when they are removed from the replicas. The control systems program into the program units of the magazine when inserted into the central control system a number of rounds authorized for the magazine. Further, the central control system can adjust or reset the firing rate for the magazine and other operating parameters of the unit. The adjusted firing rate of the magazine is communicated to the replica control systems when the magazine is inserted into the receiving portion of the replica. Data updates or adjustments to the processing unit on the magazine can be accomplished by inserting the magazine into a docking unit connected to the central control unit or by wireless or other communications link with the magazine. For example, when docked in communication with the central control system, communications link 64 can be in operable communication with the central control system.

Accordingly, it can be seen that in some embodiments, the control system of the replica accomplishes a "handshake" with the processing unit of the magazine when the magazine is inserted into the replica. With the handshake a number of things can be accomplished depending on the particular embodiment applied. In one instance, the newly inserted magazine indicates to the control system the number of rounds authorized for the magazine. This may be 10, 12, 20, 30 or any other predetermined number. The control system can then use this number of rounds, counting rounds fired while the particular magazine is in the replica and stopping firing of the replica when the specified number of rounds have been fired. Additionally the processing unit of the magazine can communicate a firing rate to be used by the replica when the magazine is installed in the replica. This firing rate is then used by the processing unit of the control system to time and sequence the firing of the replica and the activation of the recoil mechanisms to match the specified firing rate. Thus the firing rate of the replica can be easily adjusted whenever a magazine having a different specified firing rate is inserted into the replica. Additional data that can be communicated from the magazine includes, the identity of authorized users of the replica, approved locations for operation of the replica, times or calendar dates at which use of the replica is authorized, sound simulation authorization or deactivation, recoil activation or deactivation, performance tracking or deactivation, or any other operational aspect of the replica controlled by the control system. As described above, all these operational parameters communicated from the magazine to the control system can be reprogrammed into the magazine or adjusted by the central control system.

Additionally, the data communicated to the control system from the inserted magazine can also be communicated to the control system by a communications tether or wireless communications from the central control system. Additionally, adjustment systems can be provided on the replica itself for adjusting the above described parameters. For example the firing rate can be adjusted by a switch or other device on the replica.

Of course in some embodiments physical projectiles are not expended by the replica and instead light or laser emissions are used by the replica and sensed or seen at a target. However, even in these instances, the appropriate adjustable parameters described above can also be adjusted with insertion of a new magazine or by other communication from the central control system.

These components of the control systems can work with the other components of the control systems to provide numerous functional features in the use of the replicas. For example, if the replica is intended to be used at a firing range, programmable systems in cooperation with orientation sensors or other devices can be used to determine the correct downline firing orientation for the replica and the control system configured such that the replica of is only enabled to fire projectiles when pointed within the appropriate spectrum of downline orientations. In this example, the electronic or digital compasses or other orientation sensors or devices embodied in the replica could be used to identify, at times, or at all times in operation, the orientation of the replica—whether it be within the predetermined spectrum of downline orientations or outside the predetermined spectrum of downline orientations. If the orientation of the replica is outside the predetermined spectrum of downline orientations, he firing mechanisms of the replica can be disabled until the replica is real oriented into an approved downline orientation. Embodiments comprising these aspects of the present invention are particularly useful in training exercises at sites such as firing ranges. The systems provide a significantly increased measure of safety, ensuring that the replicas cannot be fired in any but a safe direction. Such systems may be particularly useful when training inexperienced users of the replicas or actual firearms.

In some embodiments, the control systems can also function to provide feedback and training to the users of the replicas. Such feedback and training can be provided with regard to firing techniques of the replica. For example, accelerometers, gyros or other movement sensors and/or portions of the control system may sense shake or motion imparted to the replica by the user during the firing sequence. Such excessive shake or motion may frequently adversely affect the accuracy of the firing of the replica. The control systems, when sensing shake or motion during the firing sequence may perform a number of functions, including disabling firing (such as until acceptable shake or motion only is detected), record the amount of shake or motion occurring in the replica, communicate the amount or the fact of shake or motion during firing such as to a central control monitor or by audio or visual alert to the user of the replica. By providing this feedback to the user, the replica enables the user to individually optimized his or her techniques in firing the replica. Such optimization is extremely valuable when training armed services personnel or law enforcement personnel for whom accuracy of firearm firing is critical not only to their roles but also to their survivability.

An example of such feedback sensors can be audio or visual or both. An audio signal can be emitted indicating the duration and direction of movement by the operator. For example a pull to the left can be indicated by one tone a pull to the right by another tone. The extent of the pull can be indicated by the duration of the tone or the volume of the tone. Additionally visual indicators such as LED's on the replica can indicate the direction and extent of the movement by the operator. In some embodiments, the LED's can be mounted on the front or rear sights of the replica. If the operator supplied a pull to the right upon firing, the LED's on the sight could light up in the direction to the right of the sight. Further the amount of LED's lighted to the right could indicate the relative amount of pull to the right. The LED's could similarly indicate pull to the left or up or down. According to these implementations, the user is provided with immediate feedback as to all the movements imparted to the replica in the user's firing of the replica. Using this feedback the operator can attempt to adjust his firing practices and build muscle memory in practices in which the sensors indicate highly minimized operator shake or movement during firing of the replica.

The control systems of the replica can also be programmed so as to disable functionality of the replica if the replica is removed from a predetermined approved geographical location. For example, proprietors or operators of the replica may have predetermined a specified approved geographical location for use of the replica (such as at a firing range or weapons simulation or training location). The geographical limits of the approved geographical location can be programmed into the control system. As long as the GPS systems on the replica indicate that the replica is within the predetermined approved geographical location, the components of the control system responsible for geographical approval of operation of the replica can signal the control systems that the replica, as far as geographical location testing, is approved for firing. If, however the replica has been removed from the predetermined approved geographical location, the GPS systems can function with the other components of the control system to indicate to the control systems that the replica is outside of the predetermined approved geographical location and the control systems can disable firing of the replica. Such systems have a variety of uses, but tend to minimize the risk of unauthorized use of replicas and minimize also the dangers attendant upon theft of the replicas.

In some embodiments the control systems may include password or other approval sequence input systems operably connected with the control systems so that the individual replica cannot fire until the proper password or other approval sequence is input into the replica. Such input can be made manually by the user or operator of the replica, from a central control that can monitor a pure reality of replicas, or by proximity sensors with an authorization type device worn or carried by the user of the replica or by an authorization/proximity transmitter operating at a preapproved location for use of the replica. Such an authorization type device may be for example an RFID device that communicates with the control systems of the replica to confirm authentication for use of the replica.

In some embodiments, in training operations utilizing the replicas, the control systems enable a variety of useful training exercises. For example, the control systems of the replica and the attached magazine can function, either jointly or individually, to count the shots of the user from the particular magazine and to disable further firing once the predetermined number of "shots" or "rounds" in the magazine are expended until a new magazine for which the magazine control systems indicate unfired "rounds" are in the magazine is inserted into the replica. The replica can be configured so that when the control systems indicate that the magazine is empty, the replica will function as an actual firearm would when the rounds in the magazine are expended. In some such simulations, the action of the replica would then remain open until released by the user or until a new "loaded" magazine is inserted into the replica. The control system can be programmed to insure that the replica functions in all regards as would the actual firearm that is being simulated. The user thus experiences the realities of a limited capacity magazine during a training exercise. By way of another example, if the training exercise is not simply on a firing range but rather in a simulated urban or rural environment, or other environment, the control systems can detect, track and record the location, time, orientation, motion, firing sequence, number of shots fired, orientation of shots fired, motion associated with firing, as well as other aspects of the exercise during the entire duration of the simulation or training exercise. The recorded information can be recorded in the control systems of the replica, or can be transmitted in real time to central control monitoring systems by which the actions and use of all or some of the replicas in operation at the site can be monitored. Records can be kept of the details of the accumulated training exercises of each individual undergoing the simulation or training. Thus a complete file for each user of the replica can be kept. The data from these files can be analyzed by programmable systems to determine characteristics of each user, improvement of each user, lack of improvement of each user, or other characteristics as desired. Additionally, if dangerous behavior or actions are sensed by the control systems of the replica on the part of any user of a replica, manual or automatic programmed systems can be implemented to disable the firing of the inappropriately operated replica.

Systems according to aspects of the present invention can provide that a plurality of replicas can each fire or operate pursuant to individualized parameters based simply on the programming of a magazine inserted into the replica. Thus a system can be provided in which a plurality of replicas can be in use, but the firing characteristics of any individual replica custom set for any particular user depending on the programmed characteristics of the magazine presented into the replica by the individual user. Additionally, if desired and as appropriately programmed the plurality of replicas will not fire at all until a magazine is inserted and maintained in any individual replica.

The replicas can be configured to fire a variety of fashions of projectiles. One type of projectiles suited for use by the replica is ball bearings. The caliber of the ball bearings may range from 0.177 inches (the classic BB caliber) or smaller up to larger calibers of 0.5 inches or larger. In other embodiments the projectiles can be of a shape other than spherical. The barrels of the replicas may be either smoothbore or grooved or rifled. The projectiles may be fired at velocities of less than 100 fps up to 700 fps or more. The replicas may be configured to fire in single shot, burst mode, or full automatic mode. In some embodiments the control system allows for the customization of the rate of fire to match that desired by the particular user. For example some branches of the armed services have their actual firearms set to fire at a specified rate of fire. To simulate the specified rate of fire, the replicas to be used for training by the branch of the armed services (or other organization) can be adjusted to match the rate of fire of the actual firearms of the particular branch of the armed services.

The replicas may comprise sound ports that utilize energies such as compressed gas in conjunction with the firing of the replica to simulate the actual sound of a gun powder firearm being fired. This can assist the user to become accustomed to the sound and circumstance of firing the gun powder firearm of which the replica is only a simulation.

In some embodiments the replicas may also include recoil simulation systems. In some embodiments, the recoil simulation mechanism is located in the stock of a shoulder fired replica. The recoil simulation mechanism may include a mass devices configured to travel, powered by compressed gas, spring energy, or other energy needs, and then to stop travel with the firing of the replica to simulate the actual recoil of the actual gunpowder firearm which is being replicated. The mass of the mass device, the travel of the mass device, the timing of the recoil simulation, certain spring affects and sounds can be adjusted in the design of the replica to very closely or exactly replicate the user experience in firing the gun powder firearm which is being simulated with the replica.

In some embodiments, the replicas can be used for training purposes. In some embodiments has been found useful that the replica not fire a projectile at an extremely high velocity. Instead, in some embodiments, it has been found that the ball bearing projectiles need only be fired at targets positioned at a range of less than 100 feet from the user of the replica. Adequate training can be accomplished in many instances at this range. By providing a system with relatively slow projectile velocities and not long carries of projectiles, a relatively safe training system has been invented. In some embodiments, the replica can be configured to fire at a reduced sound level. This is also useful if the replica is being used in environments where a reduced sound level is desired.

In some embodiments, the replicas can be used for operational, i.e., non-training, purposes. In some embodiments, a relatively larger caliber projectile can be used. In some embodiments relatively high velocities for the projectile can be used, in some embodiments relatively high rates of fire of projectiles can be used. Some embodiments with aspects of these configurations can be particularly useful to law enforcement and or armed services needs and purposes. For example, rates of fire can be set from less than 100 firings per minute, to over 700 firings per minute with various rates also selected between these ranges. Additionally, velocities of projectiles can be provided at velocities of less than 100 fps up to 700 fps or more In some embodiments, the processing units of a magazine inserted into the replica can communicate with the control systems in the replica by direct electrical connection, by magnetic coupling with the replica, by optical coupling, or other systems. In some embodiments the magazines can be parasitic from the replica—not having batteries or gas power in the magazine. In some embodiments the magazines can have their own batteries and/or gas systems.

In some embodiments the replicas can be self contained while in other embodiments the replicas can be tethered, with the tether supplying any of electrical power, communications functions, compressed gas or air, supply of projectiles and the like.

In some embodiments, the magazines couple with the replica by one or more proximity switches configured to minimize the effects of rough handling, dirty environments, physical shock to the replicas and the like.

In some embodiments the replicas can be configured to receive high capacity magazines or tethers that supply a large capacity of projectiles.

In some embodiments a system can be configured having one or more replicas in communication with one or more central control units. The communication can be optical, hard wired, via radio frequency or other desired methods. The central control units can monitor the real time operation of each replica, can send instructions to any replica to perform certain functions or shutdown or enable operations. Examples of instructions can include an instruction to replicate a jammed weapon or some other disfunctionality in the replica that the user of the replica must remedy before the replica becomes functional again. The control systems on the replica can monitor and record all the actions taken by the user in response to the programmed or other disfunctionality of the replica. Records can be kept for instructional, monitoring or other purposes of the actions and reactions of each user of any of the replicas.

In some embodiments, the replicas may include non-alterable identification systems in the control systems of each replica, thus facilitating tracking of each replica.

In some embodiments, the replica may include an air piston disposed to accomplish or facilitate any of the following: to fire a projectile, to power the recoil simulator, to reset the recoil simulator, to provide sound simulation, to reload a new projectile. In some embodiments, the replica may have a compressed gas reservoir or combination of gas reservoirs located in various compartments of the replica. In some embodiments the reservoirs are replaceable and/or refillable in situ.

In some embodiments of replicas of handguns, the recoil simulator is configured into the rear upper portion of the replica to provide realistic recoil simulation. In some embodiments the action of a handgun or shoulder fired replica can be actuated in conjunction with the firing of the replica. Additionally, the action can be left in an open position after all the authorized rounds for a particular magazine are expended and until the action is either released by the operator or a new magazine with "fire ready" rounds is inserted into the replica.

In some embodiments, a microprocessor in the magazine will allow for the programming of the number of rounds in the magazine, failures, and/or other parameters unique to the particular exercise of the training.

In some embodiments, the replica is tethered to a compressed gas reservoir that can be carried by the user, such as in a pocket, in a vest or on a belt of the user.

In some embodiments, the magazine can be designed to receive specially configured projectile feeder supplies to facilitate ease of reloading of the magazines.

In some embodiments, the replica can be configure to fire a projectile virtually silently.

In some embodiments the control system of the replica can be set, including by data communicated from a magazine, from a central control system, or by adjustments to settings on the replica, to fire an unlimited number of rounds—e.g., a number of rounds not limited to a predetermined number per magazine. Such embodiments are of particular use when firing light or laser emissions as compared to projectiles. Such embodiments can also be used when a large reservoir of projectiles is attached to the replica.

In some embodiments using a laser emission for firing, a laser emission unit can be positioned at or inside the end of the replica barrel. In some embodiments the direction of the laser can be adjusted by set screws applied to the laser emission unit to enable adjustment in each of a north, south, east, and west direction. Fine tuning laser sighting can then later be accomplished by using the regular sights of the replica. In some embodiments, the laser emission unit can be mounted in the barrel assembly and even in the breach region of the replica and the laser directed down the barrel of the replica.

In this application the words compressed gas and compressed air are frequently used interchangeably except as otherwise specified.

In some embodiments a replica of a gunpowder firearm may be configured to interchangeably fire a laser or other light energy beam or to utilize compressed gas or air to fire a projectile. Thus, the same replica can, with quick modifications, be configured to fire either light energy or a physical projectile. In this fashion, the same replica can be used in a variety of training or operational exercises.

While particular embodiments of the invention and variations thereof have been described in detail, other modifications and methods will be apparent to those of skill in the art. Accordingly, it should be understood that various applications, modifications, and substitutions may be made of equivalents without departing from the spirit of the invention or the scope of the claims. Various terms have been used in the description to convey an understanding of the invention; it will be understood that the meaning of these various terms extends to common linguistic or grammatical variations or forms thereof. Further, it should be understood that the invention is not limited to the embodiments that have been set forth for purposes of exemplification, but is to be defined only by a fair reading of claims that will be appended, including the full range of equivalency to which each element thereof is entitled.

What is claimed is:

1. A firearm replica comprising:
a control processing unit in the replica;
a magazine designed to be received by the replica;
a magazine processing unit in the magazine;
communications systems providing communication between the processing unit in the magazine and the control processing unit in the replica when the magazine is inserted into the replica; and a recoil device comprising a recoil piston, recoil cylinder body, and a recoil anvil; and an actuator solenoid; and wherein:

the replica is adapted to utilize compressed gas to fire projectiles;

the recoil piston travels under pressure of compressed gas to strike the recoil anvil; and the recoil device is coupled to the actuator solenoid via a flexible substrate.

2. The firearm replica of claim 1 wherein:

the control processing unit is provisioned to receive data from the magazine processing unit in a magazine inserted into the replica and adjust firing operations of the replica in response to the data received from the magazine processing unit in the magazine.

3. The firearm replica of claim 2 wherein the firing operations adjusted includes a firing rate of the replica.

4. The firearm replica of claim 2 wherein the firing operations adjusted includes the number of times the replica is authorized to be fired while the magazine is in the replica.

5. The firearm replica of claim 2 wherein the data received includes an identity of an authorized operator for the replica.

6. The firearm replica of claim 1, wherein:

the replica is adapted to utilize:

a first compressed gas from a first reservoir to fire projectiles; and a second compressed gas from a second reservoir to cause the recoil piston to strike the recoil anvil.

7. The firearm replica of claim 1, wherein the compressed gas comprises nitrogen.

8. The firearm replica of claim 1, wherein the compressed gas comprises compressed air.

9. The firearm replica of claim 1, further comprising a reservoir to store the compressed gas.

10. The firearm replica of claim 9, wherein the reservoir is tethered to the firearm replica.

11. The firearm replica of claim 1; further comprising a feed fire solenoid.

12. The firearm replica of claim 11, wherein the control processing unit is configured to fire the feed fire solenoid a short time before firing the actuator solenoid.

* * * * *